(12) United States Patent
Kuroda et al.

(10) Patent No.: US 6,885,415 B2
(45) Date of Patent: Apr. 26, 2005

(54) OPTICAL MEMBER AND OPTICAL PRODUCT PROVIDED THEREWITH

(75) Inventors: Ryuma Kuroda, Ichihara (JP); Hiroaki Takahata, Ichihara (JP); Nobuo Oi, Narashino (JP); Kaori Tsubouchi, Ibaraki (JP); Kyoko Hino, Sodegaura (JP)

(73) Assignee: Sumitomo Chemical Company, Limited, Osaka (JP)

( * ) Notice: Subject to any disclaimer, the term of this patent is extended or adjusted under 35 U.S.C. 154(b) by 32 days.

(21) Appl. No.: 10/332,485
(22) PCT Filed: May 9, 2002
(86) PCT No.: PCT/JP02/04537
§ 371 (c)(1),
(2), (4) Date: Jan. 9, 2003
(87) PCT Pub. No.: WO02/093208
PCT Pub. Date: Nov. 21, 2002

(65) Prior Publication Data
US 2003/0179460 A1 Sep. 25, 2003

(30) Foreign Application Priority Data
May 10, 2001 (JP) ........................................ 2001-139817
Feb. 22, 2002 (JP) ........................................ 2002-046052

(51) Int. Cl.$^7$ .......................................... G02F 1/1335
(52) U.S. Cl. ........................ 349/96; 349/158; 428/1.31
(58) Field of Search ............................ 349/96, 122, 158; 428/1.1, 1.3, 1.31, 1.6

(56) References Cited

U.S. PATENT DOCUMENTS

| 6,090,888 A | 7/2000 | Khanarian et al. |
| 6,549,195 B2 * | 4/2003 | Hikida et al. ............... 345/173 |

FOREIGN PATENT DOCUMENTS

| EP | 0 530 249 | 3/1993 |
| EP | 0 542 176 A2 | 5/1993 |
| WO | WO 91/18029 | 11/1991 |

OTHER PUBLICATIONS

T. Inoue et al, "Molecular origin of viscoelasticity and chain orientation of glassy polymers", Rheologica Acta, vol. 36, No. 3, pp. 239–244, 1997.*

* cited by examiner

*Primary Examiner*—Toan Ton
*Assistant Examiner*—Tai Duong
(74) *Attorney, Agent, or Firm*—Sughrue Mion, PLLC

(57) ABSTRACT

An optical member comprising a polymer which is amorphous and has a glass transition temperature of not lower than 110° C. and optical property parameters $O'_R(\infty)$ and $O'_G(\infty)$ that satisfy the following inequality (1), $$|O'_G(\infty)| < -0.75 \times |O'_R(\infty)| + 0.017 \quad (1),$$

is superior in its heat resistance and transparency and high in its stability of optical properties. Therefore, the optical member can be used as, for example, a constituent of optical systems in a liquid crystal display, thereby suppressing change in a display color tone depending on variation of using circumstances of the liquid crystal display.

12 Claims, 1 Drawing Sheet

OPTICAL MEMBER AND OPTICAL PRODUCT PROVIDED THEREWITH

TECHNICAL FIELD

The present invention relates to an optical member suitably applicable to optical products such as liquid crystal displays and an optical product provided with said optical member.

BACKGROUND ART

In recent years, various plastic materials having optical characteristics such as high transparency have been used for lenses such as lenses for eyeglasses, f·θ lenses and pick up lenses, prisms, optical fibers, disk substrates for an optical recording medium or a magneto-optical recording medium, and constituents of a liquid crystal displays. It is important for plastic materials, particularly, those used as a material for a constituent of optical systems in a liquid crystal display provided with a carrying plate, a polarizing plate, a substrate of liquid crystal cells, a light diffusion plate and a condensing film, to be transparent as well as superior in their properties to polarization and their heat resistance. However, plastic materials now used for a constituent of optical systems in an optical product are not sufficient in their properties to polarization. For example, a liquid crystal display comprising a part of a conventional plastic material as the optical systems frequently results in change in a display color tone depending upon variation of using circumstances such as a temperature variation and a humidity variation.

PROBLEM TO BE SOLVED BY THE INVENTION

Under these circumstances, an object of the present invention is to provide an optical member superior in its optical properties and heat resistance. Another object of the present invention is to provide an optical member capable of suppressing change in display color tone when used, for example, as a constituent of optical systems or as a part thereof in a liquid crystal display.

DISCLOSURE OF INVENTION

The present inventors have extensively studied, and as a result, it has been found that a polymer having specific values of optical property parameters, O'R(∞) and O'G(∞), is suitable as a material for an optical member, and by using it, the above-described problems can be solved. Further, it has been found that the above-described polymer particularly suitable as a material for an optical member is composed of plural kinds of monomer units having specific polarization independently. The present inventors have accomplished the present invention based on the above-described findings.

That is, the above-described problems can be solved by the following means [1] to [11].

[1] An optical member comprising a polymer which is amorphous and has a glass transition temperature of not lower than 110° C. and optical property parameters $O'_R(\infty)$ and $O'_G(\infty)$ that satisfy the following inequality (1), $$|O'_G(\infty)|' < -0.75 \times |O'_R(\infty)| + 0.017 \tag{1}$$

[2] The optical member according to the foregoing item [1], wherein the polymer comprises a copolymer comprising an m kind of monomer unit satisfying the following inequality (2), wherein m is an integer of not less than 1, and an n kind of monomer unit not satisfying the following inequality (2), wherein n is an integer of not less than 1, and satisfying the following inequalities (3) and (4), $$-9.5 \times 10^{-25} \text{ cm}^3 < \Delta\alpha_R^S \tag{2}$$

$$-1.0 \times 10^{-24} < \Delta\alpha_R^P < -5.0 \times 10^{-25} \text{ cm}^3 \tag{3}$$

$$3.4 \times 10^{-25} < \Delta\alpha_G^P < 5.4 \times 10^{-25} \text{ cm}^3 \tag{4}$$

wherein, in inequality (2), $\Delta\alpha_R^S$ is a parameter defined by the following equality (I), $$\Delta\alpha_R^S = \alpha_1^S - (1/2)(\alpha_2^S + \alpha_3^S) - (3/4)P(\alpha_1^S - \alpha_3^S) \tag{I}$$

wherein, in equality (I), $\alpha_1^S$, $\alpha_2^S$ and $\alpha_3^S$ are each a main value of polarizability tensor of a side chain in a monomer unit and satisfy a relation of $\alpha_2^S \geq \alpha_1^S \geq \alpha_3^S$, and P is 0 when the monomer unit has a side chain bonding to main chain at two or more positions, or P is 1 when the monomer unit has no side chain bonding to main chain at two or more positions, and wherein, in inequalities (3) and (4), $\Delta\alpha_R^P$ and $\Delta\alpha_G^P$ are parameters defined by the following equalities (i) and (ii), respectively, $$\Delta\alpha_R^P = \sum_{i=1}^{m}(X_i \Delta\alpha_{RAi}^S) + \sum_{j=1}^{n}(Y_j \Delta\alpha_{RBj}^S) \tag{i}$$

$$\Delta\alpha_G^P = \sum_{i=1}^{m}(X_i \Delta\alpha_{GAi}^S) + \sum_{j=1}^{n}(Y_j \Delta\alpha_{GBj}^S) \tag{ii}$$

wherein, in equalities (i) and (ii), $X_i$ is a molar fraction of an arbitrary monomer unit satisfying inequality (2), $Y_j$ is a molar fraction of an arbitrary monomer unit not satisfying inequality (2), $\Delta\alpha_{RAi}^S$ is $\Delta\alpha_R^S$ of an arbitrary monomer unit satisfying inequality (2), $\Delta\alpha_{RBi}^S$ is $\Delta\alpha_R^S$ of an arbitrary monomer unit not satisfying inequality (2), and, in equality (ii), $\Delta\alpha_{GAi}^S$ and $\Delta\alpha_{GBi}^S$ are $\Delta\alpha_G^S$ value defined by the following equality (II) with respect to an arbitrary monomer unit satisfying inequality (2) and $\Delta\alpha_G^S$ value defined by the following equality (II) with respect to an arbitrary monomer unit not satisfying inequality (2), respectively, $$\Delta\alpha_G^S = (1/4)(\alpha_2^S - \alpha_3^S) - (1/8)P(\alpha_1^S - \alpha_3^S) \tag{II}$$

wherein, in equality (II), $\alpha_1^S$, $\alpha_2^S$, $\alpha_3^S$ and P are as defined above.

[3] The optical member according to the foregoing item [2], wherein the copolymer comprises a monomer unit derived from a compound selected from the group consisting of olefins having 2 or 3 carbon atoms, norbornene and norbornene derivatives as the monomer unit satisfying inequality (2), and a monomer unit derived from a vinyl group-containing cyclic compound as the monomer unit not satisfying inequality (2).

[4] The optical member according to the foregoing item [3], wherein the copolymer comprises a monomer unit derived from an aromatic vinyl compound as the monomer unit not satisfying inequality (2).

[5] The optical member according to the foregoing item [4], wherein the copolymer has a total molar fraction of the monomer unit not satisfying inequality (2) ranging from 0.1 to 0.4 inclusive.

[6] The optical member according to the foregoing item [3], wherein the copolymer comprises a monomer unit derived from an alicyclic vinyl compound as the monomer unit not satisfying inequality (2).

[7] The optical member according to the foregoing item [6], wherein the copolymer has a total molar fraction of the monomer unit not satisfying inequality (2) ranging from 0.3 to 0.8 inclusive.

[8] The optical member according to any one of the foregoing items [1] to [7], which is a polarizing plate-protecting film.

[9] The optical member according to any one of the foregoing items [1] to [7], which is a substrate for liquid crystal cells.

[10] A polarizing plate, wherein the optical member according to any one of the foregoing items [1] to [7], which is a polarizing plate-protecting film, is mounted on at least one side surface of a polarizing film.

[11] A liquid crystal display, which is provided with a substrate of liquid crystal cells according to the foregoing item [9] and/or a polarizing plate according to the foregoing item [10].

BEST MODE FOR CARRYING OUT THE INVENTION

Figure 1:
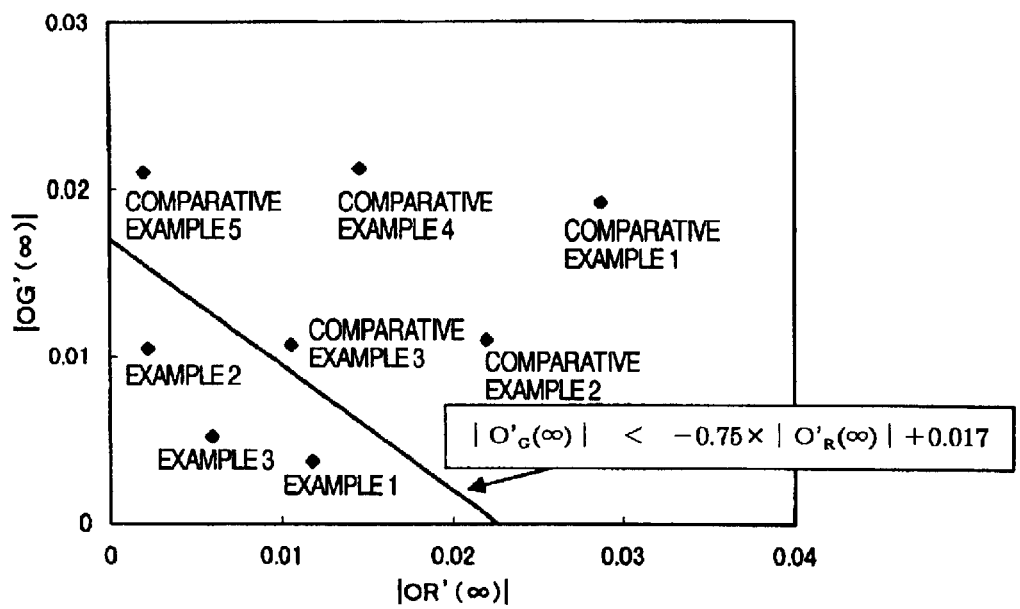
FIG. 1 is a graph showing $O'_R(\infty)$ and $O'_G(C)$ of the polymers obtained in Examples 1 to 3 and Comparative Examples 1 to 5.

In the present invention, the term "optical member" means a member having an optical function. The optical member is not particularly limited in its size, its shape and its existing state. The optical member in accordance with the present invention can be (1) one existing by itself independently, (2) one integrally formed with other parts by means of laminating or the like, or (3) one combined with other parts by means of supporting or fixing in an appropriate manner to constitute an apparatus. Examples of the optical member in the state of (1) include lenses, prisms, optical fibers, disk substrates for an optical recording medium or a magneto-optical recording medium, which are now stored or distributed to be used as a part for an apparatus; polarizing plate-protecting films, which are awaiting lamination with a polarizing film for polarizing plate use, and substrates for liquid cells to be used for a liquid crystal display. Examples of the optical member in the state of (2) include polarizing plate-protecting films constituting a polarizing plate through lamination with a polarizing film and liquid cell substrates, which have been used for a liquid crystal display. Examples of the optical member in the state of (3) include lenses of a pair of spectacles that have been furnished with a flame, fez lenses that have been incorporated in a laser printer, and pick up lenses that have been incorporated in a CD player and a DVD player.

The optical member in accordance with the present invention comprises a polymer which is amorphous and has a glass transition temperature of not lower than 110° C. and optical property parameters $O'R(\infty)$ and $O'G(\infty)$ that satisfy the following inequality (1) The polymer is superior in its heat resistance, because its glass transition temperature is not lower than 110° C. Further it is superior in its transparency, because it is amorphous. It has superior optical properties, because its optical property parameters, $O'_R(\infty)$ and $O'_G(\infty)$, satisfy the following inequality (1).

$$|O'_G(\infty)| < -0.75 \times |O'_R(\infty)| + 0.017 \tag{1}$$

The $O'_R(\infty)$ and $O'_G(\infty)$ in the present invention are parameters showing optical properties of a polymer, and defined as follows.

<Definition of $O'_R(\infty)$ and $O'_G(\infty)$>

The $O'_R(\infty)$ and $O'_G(\infty)$ of a polymer are defined according to a rule of corrected stress optics (See T. Inoue et al. "Polymer", 38, 1215, 1997; T. Inoue et al. "Rheologica Acta", 36, 239, 1997; T. Inoue et al. "Macromolecules", 29, 6240, 1996; T. Inoue et al. "Macromolecules", 24, 5670, 1991; and T. Inoue et al. "KOBUNSHI RONBUN-SHU (a collection of papers on high molecules)", 53, 602, 1996).

When vibration distortion $\epsilon^*(\omega)$, which is defined by an equality, $\epsilon^*(\omega) = \epsilon_0 \cos \omega t$, wherein $\epsilon_0$ is an amplitude of distortion, $\omega$ is an angular frequency and t is time, is applied to a polymer, the stress $\sigma^*(\omega)$ generated therefrom is expressed by an equality, $\sigma^*(\omega) = \sigma_0 \cos(\omega t + \delta)$, wherein $\sigma_0$ is an amplitude of stress, $\omega$ and t are as defined above, and $\delta$ is phase difference. And complex distortion modulus $E^*(\omega)$ of said polymer is defined by an equality, $E^*(\omega) = \sigma^*(\omega)/\epsilon^*(\omega) = E'(\omega) + iE''(\omega)$, wherein $E'(\omega)$ is dynamic modulus, i is a unit of an imaginary number, and $E''(\omega)$ is loss modulus. Similarly, a complex distortion optical ratio of the polymer $O^*(\omega)$ to double refraction $\Delta n^*(\omega)$, which is simultaneously observed when the above-mentioned vibration distortion is applied to the polymer and is defined by an equality, $\Delta n^*(\omega) = \Delta n_0 \cos(\omega_t + \delta_B)$, wherein $\Delta n_0$ is inherent double refractive index and $\delta_B$ is phase difference, is defined by an equality, $O^*(\omega) = \Delta n^*(\omega)/\epsilon^*(\omega) = O'(\omega) + iO''(\omega)$, wherein $O'(\omega)$ is a real number portion of the complex distortion optical ratio and $O''(\omega)$ is an imaginary number portion thereof.

According to the rule of corrected stress optics, the stress and double refraction of the polymer are described to be the sum of two components, R and G, and the following equalities hold.

$$E'(\omega) = E'_R(\omega) + E'_G(\omega) \tag{a}$$

$$O'(\omega) = O'_R(\omega) + O'_G(\omega) = C_R E'_R(\omega) + C_G E'_G(\omega) \tag{b}$$

$$E''(\omega) = E''_R(\omega) + E''_G(\omega) \tag{c}$$

$$O''(\omega) = O''_R(\omega) + O''_G(\omega) = C_R E''_R(\omega) + C_G E'_G(\omega) \tag{d}$$

Herein, $C_R$ and $C_G$ are constants inherent to respective polymers. According to the rule of corrected stress optics, the R and G components correspond to an orientation of a main chain of the polymer and an orientation of portions of the polymer other than the main chain, respectively.

Respective limiting values, $O'R(\omega)$ and $O'_G(\infty)$, at high frequency limits of respective R and G components in the optical property parameter $O'(\infty)$ of the polymer expressed by the above equality (b) are expressed by the following equalities.

$$O'_R(\infty) = C_R E'_R(\infty) \tag{e}$$

$$O'_G(\infty) = C_G E'_G(\infty) \tag{f}$$

According to the rule of corrected stress optics, the $O'_R(\infty)$ is a parameter related with an inherent double refractive index $\Delta n_0$ as in the following equality.

$$\Delta n_0 = (5/3) \times O'_R(\infty) \tag{g}$$

The $O'_R(\infty)$ and $O'_G(\infty)$ can be determined in a manner described below.

Vibration distortion periodically varying with the lapse of time is applied to the polymer, and the generated changes in stress and double refraction are simultaneously measured.

Based on the results and according to the rule of corrected stress optics, $C_R$, $C_G$, $E'_R(\infty)$ and $E'_G(\infty)$ are determined, and the obtained values are substituted for the equalities (e) and (f), thereby determining the $O'_R(\infty)$ and $O'_G(\infty)$.

The magnitude of the $O'_R(\infty)$ and $O'_G(\infty)$ of the polymer shows a degree of optical distortion of the polymer. When the $O'_R(\infty)$ and $O'_G(\infty)$ satisfy inequality (1), the polymer is suitable as a material of the optical member. For example, when such a polymer is used as a constituent of optical systems in a liquid crystal display, change in a display color tone accompanied with variation of using circumstances can be suppressed to a satisfactory degree. From a viewpoint of suppression effect to change in a display color tone when the optical member is applied, for example, for optical systems in a liquid crystal display, it is more preferred that the $O'_R(\infty)$ and $O'_G(\infty)$ of the polymer constituting the optical member in accordance with the present invention satisfy the following inequality (1-2), and it is particularly preferred that the $O'_R(\infty)$ and $O'_G(\infty)$ satisfy the following inequality (1-3).

$$|O'_G(\infty)| < -0.37 \times |O'_R(\infty)| + 0.0083 \tag{1-2}$$

$$|O'_G(\infty)| < -0.43 \times |O'_R(\infty)| + 0.0083 \tag{1-3}$$

From a viewpoint of optical properties, it is preferred that the polymer constituting the optical member in accordance with the present invention, whose optical property parameters, $O'_R(\infty)$ and $O'_G(\infty)$, satisfy inequality (1), comprises a copolymer comprising an m kind (m is an integer of not less than 1) of a monomer unit satisfying the following inequality (2) (hereinafter referred to as MU 1) and an n kind (n is an integer of not less than 1) of a monomer unit not satisfying the following inequality (2) (hereinafter referred to as MU 2).

$$-9.5 \times 10^{-25} \text{ cm}^3 < \Delta\alpha_R^S \tag{2}$$

In inequality (2), $\Delta\alpha_R^S$, which means polarization of a side chain of the polymer, is a parameter defined by the following equality (I).

$$\Delta\alpha_R^S = \alpha_1^S(1/2)(\alpha_2^S + \alpha_3^S) - (3/4)P(\alpha_1^S - \alpha_3^S) \tag{I}$$

In equality (I), $\alpha_1^S$, $\alpha_2^S$ and $\alpha_3^S$ are each a main value of polarizability tensor of a side chain in a monomer unit and satisfy a relation of $\alpha_2^S \geq \alpha_1^S \geq \alpha_3^S$, and P is 0 when the monomer unit has a side chain bonding to main chain at two or more positions, or P is 1 when the monomer unit has no side chain bonding to main chain at two or more positions. In other words, P is a parameter showing the presence or absence of restriction to the side chain in the monomer unit by the main chain.

Further, it is particularly preferred that the polymer satisfying the foregoing inequality (1) is a copolymer which comprises the monomer unit satisfying the above inequality (2) and the monomer unit not satisfying the above inequality (2), and moreover, is a copolymer which satisfies the following inequalities (3) and (4).

$$-1.0 \times 10^{-24} < \Delta\alpha_R^P < -5.0 \times 10^{-25} \text{ cm}^3 \tag{3}$$

$$3.4 \times 10^{-25} < \Delta\alpha_G^P < 5.4 \times 10^{-25} \text{ cm}^3 \tag{4}$$

In inequalities (3) and (4), $\Delta\alpha_R^P$ and $\Delta\alpha_G^P$ are parameters defined by the following equalities (i) and (ii), respectively.

$$\Delta\alpha_R^P = \sum_{i=1}^{m}(X_i \Delta\alpha_{RAi}^S) + \sum_{j=1}^{n}(Y_j \Delta\alpha_{RBj}^S) \tag{i}$$

$$\Delta\alpha_G^P = \sum_{i=1}^{m}(X_i \Delta\alpha_{GAi}^S) + \sum_{j=1}^{n}(Y_j \Delta\alpha_{GBj}^S) \tag{ii}$$

In equalities (i) and (ii), $X_i$ is a molar fraction of an arbitrary monomer unit satisfying inequality (2) $Y_j$ is a molar fraction of an arbitrary monomer unit not satisfying inequality (2), $\Delta\alpha_{RAi}^S$ is the $\Delta\alpha_R^S$ of an arbitrary monomer unit satisfying inequality (2), $\Delta\alpha_{RBi}^S$ is the $\Delta\alpha_R^S$ of an arbitrary monomer unit not satisfying inequality (2), and $\Delta\alpha_{GAi}^S$ and $\Delta\alpha_{GBj}^S$ in equality (ii) are $\Delta\alpha_G^S$ value obtained by the following equality (II) with respect to an arbitrary monomer unit satisfying inequality (2) and $\Delta\alpha_G^S$ value obtained by the following equality (II) with respect to an arbitrary monomer unit not satisfying inequality (2), respectively. In other words, $\Delta\alpha_G^S$ is a parameter showing polarization of a side chain in a monomer unit.

$$\Delta\alpha_G^S = (1/4)(\alpha_2^S - \alpha_3^S) - (1/8)P(\alpha_1^S - \alpha_3^S) \tag{II}$$

In equality (II), $\alpha_1^S$, $\alpha_2^S$, $\alpha_3^S$ and P are as defined above. The optical member comprising the copolymer satisfying the above inequalities (3) and (4) is used as a constituent of a liquid crystal display, thereby obtaining a liquid crystal display more diminished in change of a display color tone.

It is further preferred that the monomer unit not satisfying inequality (2) satisfies the following inequality (5).

$$\Delta\alpha_G^S > 3.0 \times 10^{-25} \text{ cm}^3 \tag{5}$$

Further, it is more preferred that the monomer unit satisfying inequality (2) satisfies the following inequality (6).

$$\Delta\alpha_G^S < 8.5 \times 10^{-25} \text{ cm}^3 \tag{6}$$

The polymer satisfying inequality (5), more preferably inequality (6), has a particularly preferred $O'_G(\infty)$, and a liquid crystal display provided with the optical member comprising such a polymer as a constituent is very diminished in change of a display color tone.

In the polymer used in the present invention, a preferred value of the total molar fraction X of the monomer unit satisfying inequality (2) (MU 1) varies depending upon the kind of the monomer unit satisfying inequality (2) (MU 1) and the kind of the monomer unit not satisfying inequality (2) (MU 2), and ranges preferred from 0.2 to 0.95. When the molar fraction is controlled within such a range, a polymer having particularly preferable $O'_R(\infty)$ and $O'_G(\infty)$ can be obtained. The structure and molar fraction of the monomer unit in the polymer can be determined by measuring $^1$H-NMR spectra and $^{13}$C-NMR spectra of the polymer.

Here, the $\Delta\alpha_R^S$ and $\Delta\alpha_G^S$ are explained.

Both the $\Delta\alpha_R^S$ and the $\Delta\alpha_G^S$ are defined using a main value of polarizability tensor of a side chain in a monomer unit. In the present invention, the side chain of a monomer unit means a portion other than a main chain of a monomer unit defined below.

In the present invention, the main chain in the polymer is defined as follows. First of all, the polymer is divided into repeating units, of which the polymer is composed. Each repeating unit is called a monomer unit. For example, in the case of a polymer obtained by homo-polymerization of ethylene, the following thick line portion shows a monomer unit. In general, each monomer unit in a polymer corresponds to each monomer which has been subjected to polymerization for production of the polymer.

In the case of ethylene-vinyl acetate copolymer, the following two thick line portions are the two monomer units.

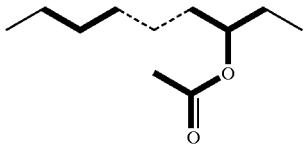

Each monomer unit except for the terminals is usually bonded with another monomer unit at two positions. In a polymer, there is a very small number of terminal monomer units, and therefore, monomer units except for the terminals are considered in the present invention.

In each of all monomer units except for the terminals in a polymer, there are two atoms involved in a bond with another monomer unit. In the present invention, a range of bonds existing, in a monomer unit, between the two atoms involved in the bonds with other monomer units and bonds between monomer units is referred to as a main chain.

For example, in the case where in one monomer unit there are two or more kinds of ranges of bonds, like norbornene, connecting the two atoms involved in the bonds with other monomer units, the shortest range among the ranges of bonds is referred to as a main chain.

Examples of the main chain in various monomer units are as follows. A thick line shows the main chain.

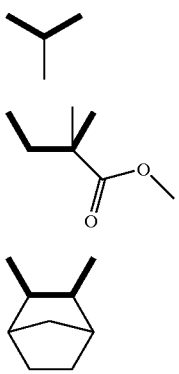

The above formula (a), formula (b) and formula (c) show a propylene unit, a methyl methacrylate unit and a norbornene unit, respectively.

The polymer used for forming the optical member in accordance with the present invention is a polymer whose main chain as defined above is composed only of a carbon—carbon single bond.

In the present invention, a portion other than the main chain of a polymer as defined above is defined to be a side chain. Examples of the side chain in various monomer units are as follows. In the following formulas, bonds between hydrogen and carbon are omitted. The side chain in the present invention includes bonds between hydrogen and carbon in the side chain and those between hydrogen and carbon in the main chain.

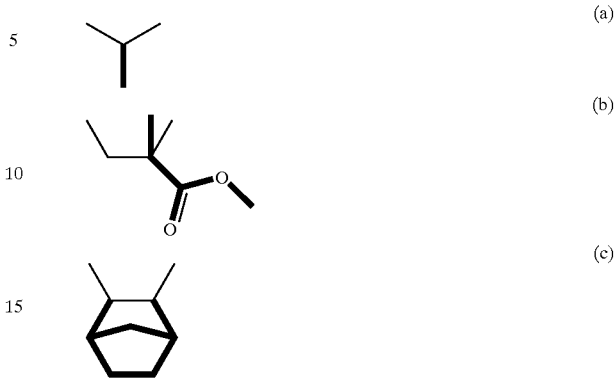

The above formula (a), formula (b) and formula (c) show a propylene unit, a methyl methacrylate unit and a norbornene unit, respectively.

It is preferred that the polymer used for the optical member according to the present invention comprises one or more kinds of monomer units belonging to one of the two kinds of the monomer units (MU 1 and MU 2) differentiated on the basis of $\Delta\alpha_R^S$ defined by equality (I) and one or more kinds of monomer units belonging to the other kind.

$$\Delta\alpha_R^S = \alpha_1^S - (1/2)(\alpha_2^S + \alpha_3^S) - (3/4)P(\alpha_1^S - \alpha_3^S) \quad (I)$$

In equality (I), $\alpha_1^S$, $\alpha_2^S$ and $\alpha_3^S$ are each a main value of polarizability tensor of side chain in monomer unit and satisfy a relation of $\alpha_2^S \geq \alpha_1^S \geq \alpha_3^S$, and P is 0 when the monomer unit has a side chain bonding to main chain at two or more positions, or P is 1 when the monomer unit has no side chain bonding to main chain at two or more positions.

The $\Delta\alpha_G^S$ in the present invention is defined by the following equality (II).

$$\Delta\alpha_G^S = (1/4)(\alpha_2^S - \alpha_3^S) - (1/8)P(\alpha_1^S - \alpha_2^S) \quad (II)$$

In equality (II), $\alpha_1^S$, $\alpha_2^S$ and P are as defined above.

The polarizability tensor of the monomer unit can be determined based on the kind and direction of chemical bond constituting said monomer unit (see K. G. Denbigh, Trans. Faraday Soc., 36, 936, 1940). The information can be surveyed by means of NMR or X-ray diffraction. According to the recent computer simulation, it is possible to calculate these values with a considerable accuracy without survey.

In the present invention, in order to make efficient development of products, the polarizability tensor of monomer units was calculated using a highly expedient computer simulation software (trade marks of CS ChemDraw Pro and CS Chem3D Pro; manufactured by CambridgeSoft Corporation). However, the calculation method is not limited thereto.

The precautions on the calculation of polarizability tensor through simulation are to draw a structure in which three monomer units, whose polarizability tensor is to be calculated, are linked together in series, and to adopt a bonding direction of the monomer unit centered as the direction of chemical bond used for the calculation. Thereby, it is taken into consideration that in a real polymer, a monomer unit is linked together in series, so that a bonding angle is influenced by steric interference of the neighbors. Therefore, as far as this is taken into consideration, the polarizability tensor may be determined in a different manner.

A process for calculation of the polarizability tensor using the CS ChemDraw Pro and CS Chem3D Pro is illustrated as follows.

A structure of three monomer units (the polarizability tensor of one of the monomer units is to be calculated) linked together in series is drawn with the CS ChemDraw Pro. The structure is formed into a 3-D picture with the CS Chem3D Pro, followed by energy-minimization operation. Thereafter, positions of at least all atoms constituting the central monomer unit are expressed using the X, Y and Z coordinates. For all bonds constituting the central monomer unit, the polarizability tensor is determined according to, for example, a Denbigh's method described in Trans. Faraday Soc., 36, 936, 1940.

In the present invention, the total polarizability tensor of the bonds except for the main chain of the monomer unit is regarded as the polarizability tensor of said monomer unit, and respective main values of said polarizability tensor are taken as $\alpha_1^S$, $\alpha_2^S$ and $\alpha_3^S$ provided that $\alpha_2^S \geq \alpha_1^S \geq \alpha_3^S$.

As equality (I) shows, the $\Delta\alpha_R^S$ is a parameter defined by using main value of polarizability tensor of the monomer unit and is used as an index for expressing the optical properties of a polymer having said monomer unit. As equality (II) shows, the $\Delta\alpha_G^S$ is also a parameter defined by using main value of polarizability tensor of the monomer unit. When used together with the $\Delta\alpha_R^S$, the $\Delta\alpha_G^S$ can serve to express the optical properties of a polymer more clearly.

P in equality (I) is 0, when the concerned monomer unit has a side chain bonding to a main chain at two or more positions, and P is 1, when the monomer unit has no side chain bonding to a main chain at two or more positions. P is a parameter showing the presence or absence of restriction to the side chain in the monomer unit by the main chain. Namely, "P=0" means that the side chain cannot freely rotate on the main chain, and "P=1" means that the side chain can freely rotate on the main chain. For example, P is 1 when the monomer unit is styrene, vinylcyclohexane or propylene, and P is zero when the monomer unit is norbornene or dimethanoocatahydronaphthalene.

The polymer according to the present invention is preferably one obtained by copolymerizing two or more kinds of monomers. Polymerization of different kinds of monomers makes it possible to obtain a polymer having flexibility and solvent resistance as well as superior optical properties and superior heat resistance, and more suitable to be used for optical member.

In the case where the polymer used for forming the optical member in accordance with the present invention is a copolymer obtained by copolymerizing two or more monomers, it is preferred that the monomer forming the monomer unit satisfying inequality (2) (MU 1) and the monomer forming the monomer unit not satisfying inequality (2) (MU 2) are those selected from the following compounds.

The monomer forming the monomer unit satisfying inequality (2) is preferably a compound selected from the group consisting of olefins having 2 or 3 carbon atoms, norbornene and norbornene derivatives. Examples thereof are ethylene, propylene, norbornene and norbornene derivatives such as 7-methyl-2-norbornene, 7-ethyl-2-norbornene, 7-chloro-2-norbornene, 7,7-dimethyl-2-norbornene, 7,7-diethyl-2-norbornene, 7-methyl-7-ethyl-2-norbornene, 5-methyl-2-norbornene, 5-ethyl-2-norbornene, 5-chloro-2-norbornene, 5,6-diethyl-2-norbornene and dimethanooctahydronaphthalene. With respect to these monomers, respective polarizablity tensor main values, $\alpha_1^S$, $\alpha_2^S$ and $\alpha_3^S$, of the side chain of the monomer unit in their polymers, and $\Delta\alpha_R^S$ and $\Delta\alpha_G^S$ are as shown below.

TABLE 1

| Monomer | $\alpha_1^S$ (cm³) | $\alpha_2^S$ (cm³) | $\alpha_3^S$ (cm³) | $\Delta\alpha_R^S$ (cm³) | $\Delta\alpha_G^S$ (cm³) |
|---|---|---|---|---|---|
| Ethylene | 2.61 × 10⁻²⁴ | 2.87 × 10⁻²⁴ | 2.32 × 10⁻²⁴ | −2.0 × 10⁻²⁵ | 1.0 × 10⁻²⁵ |
| Propylene | 4.31 × 10⁻²⁴ | 5.71 × 10⁻²⁴ | 3.78 × 10⁻²⁴ | 8.8 × 10⁻²⁵ | 4.4 × 10⁻²⁵ |
| Norbornene | 1.08 × 10⁻²³ | 1.17 × 10⁻²³ | 1.04 × 10⁻²³ | −2.5 × 10⁻²⁵ | 3.1 × 10⁻²⁵ |
| 7-Methyl-2-norbornene | 1.28 × 10⁻²³ | 1.39 × 10⁻²³ | 1.20 × 10⁻²³ | −1.2 × 10⁻²⁵ | 4.8 × 10⁻²⁵ |
| 7-Ethyl-2-norbornene | 1.53 × 10⁻²³ | 1.57 × 10⁻²³ | 1.36 × 10⁻²³ | 6.1 × 10⁻²⁵ | 5.2 × 10⁻²⁵ |
| 7-Chloro-2-norbornene | 1.28 × 10⁻²³ | 1.40 × 10⁻²³ | 1.21 × 10⁻²³ | −2.3 × 10⁻²⁵ | 4.7 × 10⁻²⁵ |
| 7,7-Dimethyl-2-norbornene | 1.50 × 10⁻²³ | 1.62 × 10⁻²³ | 1.34 × 10⁻²³ | 2.0 × 10⁻²⁵ | 7.0 × 10⁻²⁵ |
| 7,7-Diethyl-2-norbornene | 1.91 × 10⁻²³ | 1.95 × 10⁻²³ | 1.76 × 10⁻²³ | 5.5 × 10⁻²⁵ | 4.7 × 10⁻²⁵ |
| 7-Methyl-7-ethyl-2-norbornene | 1.73 × 10⁻²³ | 1.77 × 10⁻²³ | 1.54 × 10⁻²³ | 7.7 × 10⁻²⁵ | 5.7 × 10⁻²⁵ |
| 5-Methyl-2-norbornene | 1.28 × 10⁻²³ | 1.45 × 10⁻²³ | 1.14 × 10⁻²³ | −1.2 × 10⁻²⁵ | 7.9 × 10⁻²⁵ |
| 5-Ethyl-2-norbornene | 1.45 × 10⁻²³ | 1.65 × 10⁻²³ | 1.35 × 10⁻²³ | −4.8 × 10⁻²⁵ | 7.5 × 10⁻²⁵ |
| 5-Chloro-2-norbornene | 1.24 × 10⁻²³ | 1.44 × 10⁻²³ | 1.21 × 10⁻²³ | −8.5 × 10⁻²⁵ | 5.7 × 10⁻²⁵ |
| 5,6-Diethyl-2-norbornene | 1.88 × 10⁻²³ | 2.03 × 10⁻²³ | 1.71 × 10⁻²³ | 5.4 × 10⁻²⁵ | 7.9 × 10⁻²⁵ |
| Dimethano-octahydro-naphthalene | 1.75 × 10⁻²³ | 2.01 × 10⁻²³ | 1.67 × 10⁻²³ | −8.9 × 10⁻²⁵ | 8.3 × 10⁻²⁵ |
| Methyl methacrylate | 1.16 × 10⁻²³ | 1.27 × 10⁻²³ | 1.03 × 10⁻²³ | −9.1 × 10⁻²⁵ | 4.5 × 10⁻²⁵ |

It is preferred that the monomer unit satisfying inequality (2) further satisfies the following inequality (7).

$$-9.5 \times 10^{-25} < \Delta\alpha_R^S < 9.5 \times 10^{-25} \text{ cm}^3 \quad (7)$$

As a monomer forming the monomer unit satisfying inequality (7), ethylene, propylene, norbornene and norbornene derivatives can be used. Use of ethylene and/or propylene as the monomer permits production of polymer superior in the flexibility and processability. When the polymer is particularly required to have superior heat resistance, it is preferred to use norbornene or norbornene derivatives. A molar fraction of the monomer unit derived from these monomers is preferably from 0.15 to 0.6, and particularly preferably from 0.2 to 0.5.

As a monomer forming the monomer unit not satisfying inequality (2), olefins having 4 or more carbon atoms such as 1-butene, 1-pentene, 1-hexene and butadiene, vinylcyclohexane and styrene can be used. With respect to these monomers, respective polarizablity tensor main values, $\alpha_1^S$, $\alpha_2^S$ and $\alpha_3^S$, of the side chain of the monomer unit in their polymers, and $\Delta\alpha_R^S$ and $\Delta\alpha_G^S$ are as shown below.

TABLE 2

| Monomer | $\alpha_1^S$ (cm³) | $\alpha_2^S$ (cm³) | $\alpha_3^S$ (cm³) | $\Delta\alpha_R^S$ (cm³) | $\Delta\alpha_G^S$ (cm³) |
|---|---|---|---|---|---|
| 1-Butene | 6.4 × 10⁻²⁴ | 7.9 × 10⁻²⁴ | 5.2 × 10⁻²⁴ | −1.0 × 10⁻²⁴ | 5.2 × 10⁻²⁵ |
| 1-Pentene | 8.1 × 10⁻²⁴ | 1.0 × 10⁻²³ | 6.7 × 10⁻²⁴ | −1.5 × 10⁻²⁴ | 7.4 × 10⁻²⁵ |
| 1-Hexene | 1.0 × 10⁻²³ | 1.3 × 10⁻²³ | 8.2 × 10⁻²⁴ | −1.7 × 10⁻²⁴ | 8.3 × 10⁻²⁵ |

TABLE 2-continued

| Monomer | $\alpha_1{}^S$ (cm³) | $\alpha_2{}^S$ (cm³) | $\alpha_3{}^S$ (cm³) | $\Delta\alpha_R{}^S$ (cm³) | $\Delta\alpha_G{}^S$ (cm³) |
|---|---|---|---|---|---|
| Butadiene | 6.1 × 10⁻²⁴ | 7.9 × 10⁻²⁴ | 4.6 × 10⁻²⁴ | −1.3 × 10⁻²⁴ | 6.5 × 10⁻²⁵ |
| Vinylcyclo-hexane | 1.4 × 10⁻²³ | 1.5 × 10⁻²³ | 1.2 × 10⁻²³ | −1.3 × 10⁻²⁴ | 6.3 × 10⁻²⁵ |
| Styrene | 1.4 × 10⁻²³ | 1.5 × 10⁻²³ | 7.6 × 10⁻²⁴ | −2.4 × 10⁻²⁴ | 1.2 × 10⁻²⁴ |

It is preferred that the monomer unit not satisfying inequality (2) satisfies the following inequality (8).

$$-2.5\times 10^{-24} < \Delta\alpha_R{}^S < -9.5\times 10^{-25} \text{ cm}^3 \quad (8)$$

A monomer forming the monomer unit satisfying inequality (8) includes cyclic compounds having a vinyl group such as vinylcyclohexane and styrene. Use of a vinyl group-carrying cyclic compound permits production of a polymer having a high glass transition temperature.

Further, it is more preferred that the monomer forming a monomer unit satisfying inequality (8) is an aromatic compound having a vinyl group such as styrene, namely, an aromatic vinyl compound. Use of an aromatic vinyl compound permits production of a polymer used for forming an optical member, which is very hard to cause change in display color tone when used for a liquid crystal display. When an aromatic vinyl compound is used as the monomer forming a monomer unit not satisfying inequality (2), a molar fraction of said monomer unit in the polymer is controlled within the range of from 0.1 to 0.4, thereby obtaining a polymer having preferable $O'_R(\infty)$ and $O'_G(\infty)$.

Further, it is preferred that the monomer forming a monomer unit satisfying inequality (8) is an aliphatic vinyl compound such as vinylcyclohexane. Use of such an aliphatic vinyl compound permits production of a polymer superior in solvent resistance. In this case, a molar fraction of said monomer unit in the polymer is controlled within the range of from 0.3 to 0.8, thereby obtaining a polymer having preferable $O'_R(\infty)$ and $O'_G(\infty)$.

The polymer constituting the optical member in accordance with the present invention may be a homopolymer obtained by polymerizing one kind of monomer, or a copolymer obtained by copolymerizing two or more kinds of monomers. Of these, preferred is a copolymer. With respect to the copolymer, a polymerization type may be a random type or a block type. The block type copolymer has a defect such that a micro-domain is formed due to intramolecular phase separation, thereby easily causing scattering of light. Therefore, the random type copolymer is the most preferable. A manner of the polymerization is not critical and is exemplified by addition polymerization and condensation polymerization.

The polymer constituting the optical member in accordance with the present invention has a glass transition temperature of not lower than 110° C. Thereby, the optical member becomes superior in its heat resistance. With respect to a polymer in the optical member used in a liquid crystal display for car use, or a polymer in the optical member used in combination with a back light having a high luminous flux density, the glass transition temperature (Tg) is preferably not lower than 130° C.

As described above, the polymer used for forming the optical member in accordance with the present invention is preferably a copolymer which is obtained by copolymerizing two or more kinds of monomers and which comprises one or more monomer units selected from monomer units satisfying inequality (2) (MU 1) and one or more monomer units selected from monomer units not satisfying inequality (2) (MU 2).

Specific examples of a binary copolymer are ethylene/vinylcyclohexane copolymer, norbornene/styrene copolymer and norbornene/vinylcyclohexane copolymer.

Specific examples of a ternary copolymer are ethylene/styrene/norbornene copolymer, ethylene/styrene/dimethanooctahydronaphthalene copolymer, propylene/styrene/norbornene copolymer, propylene/styrene/dimethanooctahydronaphthalene copolymer, ethylene/tert-butoxystyrene/norbornene copolymer, ethylene/vinylcyclohexane/norbornene copolymer, ethylene/vinylcyclohexane/dimethanooctahydronaphthalene copolymer, propylene/vinylcyclohexane/norbornene copolymer and propylene/vinylcyclohexane/dimethanooctahydronaphthalene copolymer.

Particularly when the optical member is formed using a ternary polymer obtained by using two kinds of monomers, namely, either ethylene or propylene and either norbornene or a norbornene derivative, as the monomers forming monomer units satisfying inequality (2), and a vinyl group-containing cyclic compound such as styrene and vinylcyclohexane as the monomer forming a monomer unit not satisfying inequality (2), such an optical member can serve to suppress change in display color tone and to improve flexibility and heat resistance when used for the optical systems in a liquid crystal display.

With respect to the polymer used for forming the optical product in accordance with the present invention, polymerization conditions such as polymerization temperature, polymerization time and, in case of production of a copolymer, feeding amounts of respective monomers can be appropriately varied, thereby controlling a molecular weight, $O'_R(\infty)$, $O'_G(\infty)$ and, in case of a copolymer, a copolymerization composition of the copolymer, namely, a content proportion of the monomer units. The polymerization method is not particularly limited. For example, various methods such as a gas phase polymerization method, a bulk polymerization method and a solvent or slurry polymerization method using a suitable solvent, which are carried out in either a batch manner or a continuous manner, can be applied. In addition, the polymer can be obtained by polymerizing the monomer (s) in the presence of a catalyst obtained by contacting a metallocene catalyst with an aluminum compound or a boron compound, wherein the metallocene catalyst includes isopropylidene(cyclopentadienyl)(3-tert-butyl-5-methyl-2-phenoxy)titanium dichloride, dimethylsilylene (tetramethylcyclopentadienyl)(3-tert-butyl-5-methyl-2-phenoxy)titanium dichloride, ethylenebis(indenyl) zirconium dichloride, dimethylsilylenebis(indenyl) zirconium dichloride, isopropylidenebis(indenyl)zirconium dichloride, dimethylsilylenebis(2-methyl-indenyl)zirconium dichloride, isopropylidenebis(2-methyl-indenyl)-zirconium dichloride and isopropylidene-(cyclopentadienyl) (fluorenyl)zirconium dichloride, the aluminum compound includes triethylaluminum, triisobutylaluminum and methylalumoxane, and the boron compound includes tri(n-butyl)ammonium tetrakis-(pentafluorophenyl)borate, N,N-dimethylanilinium tetrakis(pentafluorophenyl)borate and triphenylmethyl tetrakis(pentafluorophenyl)borate. The above-described catalyst system may be incorporated with a third component such as molecular oxygen, an alcohol, an ether, a peroxide, a carboxylic acid, an acid anhydride, an acid chloride, an ester, a ketone, a nitrogen-containing compound, a sulfur-containing compound, a halogencontaining compound, molecular iodine and other Lewis acids. The polymerization using said catalyst system can be carried out in the presence or absence of a solvent usually under the conditions of polymerization temperature of from −50 to 100° C. and polymerization pressure of from 0 to 50 kg/cm$^2$.

The polymer used for forming the optical member in accordance with the present invention can be appropriately blended with ultraviolet absorbers, antioxidants, lubricants, anti-static agents, antimicrobial agents, anti-fogging agents and plastisizers in a manner such that effects of the present invention are not remarkably impaired. Examples of the antioxidants usable are 6-[3-(3-methyl-4-hydroxy-5-tert-butylphenyl)propoxy]-2,4,8,10-tetra-tert-butyl-dibenz[d,f][1,3,2]dioxaphosphepin (commercial name: Sumilizer (registered trademark) GP, manufactured by Sumitomo Chemical Co., Ltd.), 2,6-di-tert-butyl-4-methylphenol (commercial name: Sumilizer (registered trademark) BHT-R, manufactured by Sumitomo Chemical Co., Ltd.), octadecyl-3-(3,5-di-tert-butyl-4-hydroxyphenol)propionate (commercial name: Sumilizer (registered trademark) BP-76, manufactured by Sumitomo Chemical Co., Ltd.), pentaerythrityltetrakis[3-(5-di-tert-butyl-4-hydroxyphenol)-propionate] (commercial name: Sumilizer. (registered trademark) BP-101, manufactured by Sumitomo Chemical Co., Ltd.) and tris(2,4-di-tert-butylphenyl)-phosphite (commercial name: Sumilizer (registered trademark) P-16, manufactured by Sumitomo Chemical Co., Ltd.).

The optical member in accordance with the present invention is high in its heat resistance and transparency and superior in its properties to polarization, and therefore suitable for lenses such as lenses for eyeglasses, f·θ lenses and pick up lenses, prisms, optical fibers, disk substrates for an optical recording medium or a magneto-optical recording medium, and a constituent of optical systems in a liquid crystal display. It is particularly suitable as a protecting film of a polarizing plate.

The optical member in accordance with the present invention, which includes constituents of a liquid crystal display typified by a carrying plate, a polarizing plate, a protecting film of a polarizing plate, a substrate of liquid crystal cells, a light diffusion plate and a condensing film, can be formed according to a forming method such as injection molding, extrusion forming, rolling and press molding. A forming method for forming the polymer used for the optical member in accordance with the present invention into a film such as a polarizing plate-protecting film and a film for liquid crystal cell substrates or a sheet is exemplified by T die cast forming, extrusion forming such as tubular film process, rolling such as calendering, press molding and solvent casting. When the polymer used for the optical member in accordance with the present invention is processed into an optical film, it is usually processed so as to have a thickness of from 50 to 300 μm.

It is preferable to form the polarizing plate by laminating the polarizing plate-protecting film in accordance with the present invention on one or both sides of the polarizing film. Materials of the polarizing film are not particularly limited. Usually, polyvinyl alcohol resins are used. How to bond the polarizing film and the polarizing plate-protecting film with each other is not particularly limited, and usually an adhesive is used. As the adhesive, for examples, urethane adhesives, acrylic adhesives, chlorinated polyolefin adhesives, ether adhesives, ester adhesives and polyethyl-eneimine adhesives are preferably used.

The polarizing plate in accordance with the present invention can be preferably used in combination with a phase difference film, a liquid crystal cell and a gas barrier layer to constitute a liquid crystal display.

The lenses for eyeglasses can be formed according to a cast polymerization method (Fumio Ide, "KOKO MADE KITA TOMEI JUSHI (Transparent Resin Improved Thus)", page 211, issued by Kogyo Chosakai Publishing Co., Ltd. (2001)).

Various lenses including pick up lenses, and prisms can be formed, for example, by injection molding (Fumio Ide, "KOKO MADE KITA TOMEI JUSHI (Transparent Resin Improved Thus)", page 97, issued by Kogyo Chosakai Publishing Co., Ltd. (2001)).

Optical fibers can be formed, for example, through spinning for the formation of fiber (original yarn), drafting and cable processing (Fumio Ide, "KOKO MADE KITA TOMEI JUSHI (Transparent Resin Improved Thus)", page 149, issued by Kogyo Chosakai Publishing Co., Ltd. (2001)).

The disk substrates for an optical recording medium or a magneto-optical recording medium can be formed, for example, by injection press molding (Fumio Ide, "KOKO MADE KITA TOMET JUSHI (Transparent Resin Improved Thus)", page 122, issued by Kogyo Chosakai Publishing Co., Ltd. (2001)).

EXAMPLES

The present invention is explained in more detail with reference to Examples as follows, but the present invention is not limited thereto.

(1) Glass Transition Temperature (Tg)

The glass transition temperature (Tg) of a polymer was measured according to JIS K7121 with use of a differential scanning calorimeter DSC 220, manufactured by Seiko Instruments Inc.

(2) $O'_R(\infty)$ and $O'_G(\infty)$

The $O'_R(\infty)$ and $O'_G(\infty)$ were determined according to a rule of corrected stress optics (T. Inoue et al. "Polymer", 38, 1215, 1997; T. Inoue et al. "Rheologica Acta", 36, 239, 1997; T. Inoue et al. "Macromolecules", 29, 6240, 1996; T. Inoue et al. "Macromolecules", 24, 5670, 1991; and T. Inoue et al. "KOBUNSHI RONBUN-SHU (Collection of Papers on High Molecules)", 53, 602, 1996). In measuring, a commercially available viscoelasticity measurement apparatus equipped with an optical system for the measurement of double refraction was used. As a sample for the measurement, a press sheet having a thickness of 500 μm was used.

Vibration distortion periodically varying with the lapse of time was applied to the polymer, and the generated changes in stress and double refraction were simultaneously measured. From the results obtained, $C_R$, $C_G$, $E'_R(\infty)$ and $E'_G(\infty)$ were determined according to the rule of corrected stress optics, and the obtained values were substituted for the equalities (e) and (f), thereby determining the $O'_R(\infty)$ and $O'_G(\infty)$ $$O'_R(\infty)=C_R E'_R(\infty) \qquad (e)$$

$$O'_G(\infty)=C_G E'_G(\infty) \qquad (f)$$

(3) $\Delta\alpha_R^S$ and $\Delta\alpha_G^S$ of monomer Unit

A structure of three monomer units (the $\Delta\alpha_R^S$ and $\Delta\alpha_G^S$ of one of the monomer units is to be calculated) linked together in series was drawn with the CS ChemDraw Pro. The structure was formed into a 3-D picture with the CS Chem3D Pro, followed by energy-minimization operation. Thereafter, all atom positions were shown using the X, Y and Z coordinates. With respect to each of the bonds other than the main chain constituting the central monomer unit, the polarizability tensors were determined, and the sum of the tensors was regarded as the polarizability tensor of said monomer unit. Then their main values, $\alpha_1^S$, $\alpha_2^S$ and $\alpha_3^S$ (provided that $\alpha_2^S \geq \alpha_1^S \geq \alpha_3^S$) were determined. Using the resulting main values, $\Delta\alpha_R^S$ and $\Delta\alpha_G^S$ were calculated from equality (I) and equality (II), respectively.

$$\Delta\alpha_R^S = \alpha_1^S - (1/2)(\alpha_2^S + \alpha_3^S) - (3/4)P(\alpha_1^S - \alpha_3^S) \quad (I)$$

$$\Delta\alpha_G^S = (1/4)(\alpha_2^S - \alpha_3^S) - (1/8)P(\alpha_1^S - \alpha_3^S) \quad (II)$$

wherein P=0 or 1.

(4) Monomer Unit Content

The contents (molar fractions, X and Y) of the monomer unit satisfying inequality (2) and the monomer unit not satisfying inequality (2) in the polymer used for the optical member were determined from $^1$H-NMR and $^{13}$C-NMR spectra, respectively.

The $^1$H-NMR spectra were measured at room temperature using a nuclear magnetic resonance apparatus, JNM-EX270, manufactured by JEOL Ltd., and using dichloromethane-$d_2$ as a solvent.

The $^{13}$C-NMR spectra were measured at 135° C. using a nuclear magnetic resonance apparatus, AC-250, manufactured by the Bruker Companies, and using o-dichlorobenzene/o-dichlorobenzene-$d_4$ (volume ratio=4/1) as a solvent.

(5) $\Delta\alpha_R^P$ and $\Delta\alpha_G^P$

The $\Delta\alpha_R^S$ and $\Delta\alpha_G^S$ of the monomer unit satisfying inequality (2) and the $\Delta\alpha_R^S$ and $\Delta\alpha_G^S$ of the monomer unit not satisfying inequality (2) are taken as $\Delta\alpha_{RAi}^S$ and $\Delta\alpha_{GAi}^S$, and $\Delta\alpha_{RBi}^S$ and $\Delta\alpha_{GBi}^S$, respectively. Using the $\Delta\alpha_R^S$, $\Delta\alpha_G^S$ and molar fractions X and Y for each monomer unit obtained above, $\Delta\alpha_R^P$ and $\Delta\alpha_G^P$ were calculated from equality (i) and equality (ii), respectively.

$$\Delta\alpha_R^P = \sum_{i=1}^{m}(X_i \Delta\alpha_{RAi}^S) + \sum_{j=1}^{n}(Y_j \Delta\alpha_{RBj}^S) \quad (i)$$

$$\Delta\alpha_G^P = \sum_{i=1}^{m}(X_i \Delta\alpha_{GAi}^S) + \sum_{j=1}^{n}(Y_j \Delta\alpha_{GBj}^S) \quad (ii)$$

(6) Change in Color Tone

A polymer film obtained by press molding was bonded to both sides of a polarizing film of polyvinyl alcohol formed according to a conventional process using an urethane adhesive, thereby obtaining a laminate film. Successively, the laminate film (polarizing plate) was cut into a piece of 130 mm square so that one of the side lines of the piece forms an angle of 45° to the absorption axis of the laminate film. Using an acrylic adhesive, the piece of laminate films were bonded to both sides of a transparent glass plate so as to form a cross Nicol, thereby obtaining a laminate product. The laminate product was allowed to stand for 500 hours at 80° C. A color tone of the laminate product before and after said treatment was observed (the presence or absence of light leakage when the laminate product was placed on a light box), thereby examining change in color tone.

Example 1

In a 400 ml autoclave purged with argon, 57 ml of styrene, 100 ml of a toluene solution of norbornene (5 mol/l) and 73 ml of dewatered toluene were introduced, and thereafter ethylene was fed to reach 0.4 MPa. To the mixture, 4 ml of a toluene solution of triisobutylaluminum (1 mol/l, manufactured by TOSOH AKZO Co.), a solution prepared by dissolving 10.8 mg of isopropylidene(cyclopentadienyl)(3-tert-butyl-5-methyl-2-phenoxy)titanium dichloride in 5.4 ml of dewatered toluene, and a mixture of 39.8 mg of N,N-dimethylanilinium tetrakis(pentafluorophenyl)borate and 10 ml of dewatered toluene were added in order, and the resulting reaction liquid was stirred for 3 hours at 50° C. Thereafter, the reaction liquid was poured into a mixture of 5 ml of hydrochloric acid (12 N) and 800 ml of acetone, and the precipitated white solid was separated by filtration. The solid was washed with acetone, and thereafter dried under reduced pressure, thereby obtaining 17.14 g of a polymer. The copolymerization composition of styrene and that of norbornene in the polymer were found to be 23 mol % and 41 mol %, respectively. Based on the fact that any endothermic peak owing to crystal melting was not observed in the DSC measurement, the polymer was confirmed to be amorphous. The polymer was press-molded at 270° C. to obtain a sheet of 500 μm thickness in a strip form, and the O'$_R$(∞) and O'$_G$(∞) of the sheet were determined in the foregoing manner. Further, the obtained polymer was subjected to press molding in a manner similar to that described above, thereby obtaining an optical film of 135 μm thickness. As a result of a test for change in color tone, the whole of the laminate product was observed to be uniformly black before and after the 80° C. treatment. Thus, there was observed almost no change in color tone by said treatment. Even when a liquid crystal display provided with said film as a polarizing plate-protecting film is employed for a long period of time, change in display color tone will be very little.

Example 2

In a 400 ml autoclave purged with argon, 17 ml of styrene, 60 ml of a toluene solution of norbornene (5 mol/l) and 54 ml of dewatered toluene were introduced, and thereafter ethylene was fed to reach 0.4 MPa. To the mixture, 4 ml of a toluene solution of triisobutylaluminum (1 mol/l, manufactured by TOSOH AKZO Co.), a solution prepared by dissolving 8.7 mg of isopropylidene(cyclopentadienyl)(3-tert-butyl-5-methyl-2-phenoxy)titanium dichloride in 4.3 ml of dewatered toluene, and a mixture of 31.5 mg of N,N-dimethylanilinium tetrakis(pentafluorophenyl)borate and 10 ml of dewatered toluene were added in order, and the resulting reaction liquid was stirred for 1 hour at 50° C. Thereafter, the reaction liquid was poured into a mixture of 5 ml of hydrochloric acid (12 N) and 800 ml of acetone, and the precipitated white solid was separated by filtration. The solid was washed with acetone, and thereafter dried under reduced pressure, thereby obtaining 8.31 g of a polymer. A copolymerization composition of styrene in the polymer and the copolymerization composition of norbornene were found to be 16 mol % and 43 mol %, respectively. Based on the fact that any endothermic peak owing to crystal melting was not observed according to DSC measurement, the polymer was confirmed to be amorphous. The polymer was press-molded at 270° C. to obtain a sheet of 500 μm thickness in a strip form, and the O'$_R$(∞) and O'$_G$(∞) of the sheet were determined in the foregoing manner. Further, the obtained polymer was subjected to press molding in a manner similar to that described above, thereby obtaining an optical film of 135 μm thickness. As a result of a test for change in color tone, the whole of the laminate product was observed to be uniform black before and after the 80° C. treatment. Thus, there was not excessively observed change in the color tone by said treatment. Even when a liquid crystal display provided with said film as a polarizing plate-protecting film is employed for a long period of time, change in display color tone will be little.

Example 3

In a 1.5 m³ autoclave purged with argon, 75 kg of styrene, 143 kg of a toluene solution of norbornene (5 mol/l) and 113 kg of dewatered toluene were introduced, and thereafter ethylene was fed to reach 0.4 MPa. To the mixture, 6.9 kg of a toluene solution of triisobutylaluminum (1 mol/l, manufactured by TOSOH AKZO Co.), a solution prepared by dissolving 12 g of isopropylidene(cyclopentadienyl)(3-tert-butyl-5-methyl-2-phenoxy)titanium dichloride in 2.8 kg of dewatered toluene, and a mixture of 51 g of N,N-dimethylanilinium tetrakis(pentafluorophenyl)borate and 8.7 kg of dewatered toluene were added in order, and the resulting reaction liquid was stirred for 3.8 hours at 50° C. Thereafter, the reaction liquid was poured into a mixture of 2 liters of hydrochloric acid (12 N) and 3600 liters of acetone, and the precipitated white solid was separated by filtration. The solid was washed with acetone, and thereafter dried under reduced pressure, thereby obtaining 34 kg of a polymer. A copolymerization composition of styrene and that of norbornene in the polymer were found to be 21 mol % and 42 mol %, respectively. Based on the fact that any endothermic peak owing to crystal melting was not observed according to DSC measurement, the polymer was confirmed to be amorphous. The polymer was press-molded at 270° C. to obtain a sheet of 500 μm thickness in a strip form, and the $O'_R(\infty)$ and $O'_G(\infty)$ of the sheet were determined in the foregoing manner. Further, the obtained polymer was subjected to press molding in a manner similar to that described above, thereby obtaining an optical film of 135 μm thickness. As a result of a test for change in color tone, the whole of the laminate product was observed to be uniformly black before and after the 80° C. treatment. Thus, there was not observed any remarkable change in color tone by said treatment. Even when a liquid crystal display provided with said film as a polarizing plate-protecting film is employed for a long period of time, change in display color tone will be very little.

Comparative Example 1

Using the film formed from the amorphous polymer obtained by polymerizing the monomer as shown in a column of Comparative Example 1 in Table 4, a test for change in color tone was carried out. Before the 80° C. treatment, the whole of the laminate product was observed to be uniformly black. Whereas, after the treatment, there was observed light leakage (white discharging) in the neighborhood of the center in each side of the laminate product. When a liquid crystal display provided with said film as a polarizing plate-protecting film is employed for a long period of time, change in display color tone will become remarkable, so that it becomes hard to handle the display.

Comparative Example 2

Using the film formed from the amorphous polymer obtained by polymerizing the monomer as shown in a column of Comparative Example 2 in Table 4, a test for change in color tone was carried out. Before the 80° C. treatment, the whole of the laminate product was observed to be uniformly black. Whereas, after the treatment, there was observed light leakage (white discharging) in the neighborhood of the center in each side of the laminate product. When a liquid crystal display provided with said film as a polarizing plate-protecting film is employed for a long period of time, change in display color tone will become remarkable, so that it becomes hard to handle the display.

Comparative Example 3

Using the film formed from the amorphous polymer obtained by polymerizing the monomers as shown in a column of Comparative Example 3 in Table 4, a test for change in color tone was carried out. Before the 80° C. treatment, the whole of the laminate product was observed to be uniformly black. Whereas, after the treatment, there was observed light leakage (white discharging) in the neighborhood of the center in each side of the laminate product. When a liquid crystal display provided with said film as a polarizing plate-protecting film is employed for a long period of time, change in display color tone will become remarkable, so that it becomes hard to use the display.

Comparative Example 4

Using the film formed from the amorphous polymer obtained by polymerizing the monomers as shown in a column of Comparative Example 4 in Table 4, a test for change in color tone was carried out. Before the 80° C. treatment, the whole of the laminate product was observed to be uniformly black. Whereas, after the treatment, there was observed light leakage (white discharging) in the neighborhood of the center in each side of the laminate product. When a liquid crystal display provided with said film as a polarizing plate-protecting film is employed for a long period of time, change in display color tone will become remarkable, so that it becomes hard to use the display.

Comparative Example 5

In a 400 ml autoclave purged with argon, 11.4 ml of styrene, 20 ml of a toluene solution of norbornene (5 mol/l) and 105 ml of dewatered toluene were introduced in advance, and thereafter ethylene was fed to reach 0.8 MPa. A solution prepared by dissolving 15.5 mg of isopropylidene-(cyclopentadienyl)(3-tert-butyl-5-methyl-2-phenoxy)titanium dichloride in 15 ml of dewatered toluene and 2.5 ml of a toluene solution of triisobutylaluminum (1 mol/l, manufactured by TOSOH AKZO Co.) was mixed and added thereto. Successively a solution prepared by dissolving 80.1 mg of N,N-dimethylanilinium tetrakis (pentafluorophenyl)borate in 47 ml of dewatered toluene was added thereto. The resulting reaction liquid was stirred for 1 hour at 60° C. Thereafter, the reaction liquid was poured into a mixture of 5 ml of hydrochloric acid (12 N) and 1000 ml of acetone, and the precipitated white solid was separated by filtration. The solid was washed with acetone, and thereafter dried under reduced pressure, thereby obtaining 26.85 g of a polymer. A copolymerization composition of styrene and that of norbornene in the polymer were found to be 16 mol % and 15 mol %, respectively. Based on the fact that any endothermic peak owing to crystal melting was not observed according to DSC measurement, the polymer was confirmed to be amorphous. The polymer was press-molded at 190° C. to obtain a sheet of 500 μm thickness in a strip form, and the $O'_R(\infty)$ and $O'_G(\infty)$ of the sheet were determined in the foregoing manner. Further, the obtained polymer was subjected to press molding in a manner similar to that described above, thereby obtaining an optical film of 135 μm thickness. Using the resulting film, a test for change in color tone was carried out. Before the 80° C. treatment, the whole of the laminate product was observed to be uniformly black. Whereas, after the treatment, there was observed light leakage (white discharging) in the neighborhood of the center in each side of the laminate product. When a liquid crystal display provided with said film as a polarizing plate-protecting film is employed for a long period of time, change in display color tone will become remarkable, so that it becomes hard to use the display.

Figure 2:
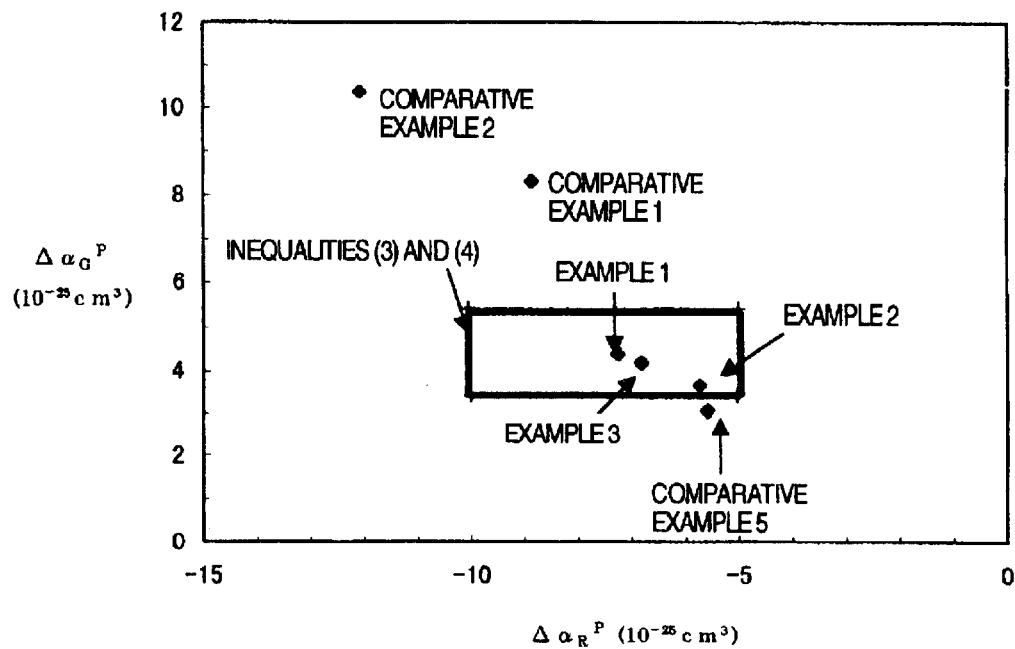
FIG. 2 is a graph showing $\Delta\alpha_R^P$ and $\Delta\alpha_G^P$ calculated from the monomer units constituting the polymers obtained in Examples 1 to 3 and Comparative Examples 1 to 5.

With respect to each polymer obtained in the above Examples 1 to 3 and Comparative Examples 1 to 5, $\Delta\alpha_R^S$ and $\Delta\alpha_G^S$ of each monomer unit constituting the polymer, the molar ratio of each monomer unit in the polymer, $O'_R(\infty)$, $O'_G(\infty)$ and the glass transition temperature of the polymer and the result of change in color tone of the polarizing plate formed using the polymer are summarized in Table 3, Table 4, FIG. 1 and FIG. 2. The change in color tone of each sample (laminate product) examined according to the foregoing test method was expressed based on the following criteria (1) to (5).

(1): Almost no change in color tone is observed.

(2): Change in color tone is observed to be more intense than (1) but less intense than (3).

(3): Slight change in color tone is observed, but the degree of change in color tome is not problematic from a practical point of view.

(4): Change in color tone is observed to be more intense than (3) but less intense than (5).

(5): Considerable change in color tone is observed.

TABLE 3

| | Monomer unit | | $O'_R(\infty)$ | $O'_G(\infty)$ | $\Delta\alpha_R^S$ | $\Delta\alpha_G^S$ | | $\Delta\alpha_R^S$ ($10^{-25}$ | $\Delta\alpha_G^S$ ($10^{-25}$ | | Change in color |
|---|---|---|---|---|---|---|---|---|---|---|---|
| | Name | Structure | (x$10^2$) | (x$10^2$) | ($10^{-25}$ cm$^3$) | ($10^{-25}$ cm$^3$) | Mol % | cm$^3$) | cm$^3$) | Tg (° C.) | tone |
| Example 1 | Ethylene (MU1) | | −1.2 | −0.37 | −2.0 | 1.0 | 36 | −7.3 | 4.4 | 133 | (2) |
| | Norbornene (MU1) | | | | −2.5 | 3.1 | 41 | | | | |
| | Styrene (MU2) | | | | −23.9 | 12.0 | 23 | | | | |
| Example 2 | Ethylene (MU1) | | −0.22 | −1.1 | −2.0 | 1.0 | 41 | −5.7 | 3.6 | 140 | (3) |
| | Norbornene (MU1) | | | | −2.5 | 3.1 | 43 | | | | |
| | Styrene (MU2) | | | | −23.9 | 12.0 | 16 | | | | |
| Example 3 | Ethylene (MU1) | | −0.60 | −0.52 | −2.0 | 1.0 | 37 | −6.8 | 4.2 | 133 | (1) |
| | Norbornene (MU1) | | | | −2.5 | 3.1 | 42 | | | | |
| | Styurene (MU2) | | | | −23.9 | 12.0 | 21 | | | | |

TABLE 4

| | Monomer unit | | $O'_R (\infty)$ (x10$^2$) | $O'_G (\infty)$ (x10$^2$) | $\Delta\alpha_R^S$ (10$^{-25}$ cm$^3$) | $\Delta\alpha_G^S$ (10$^{-25}$ cm$^3$) | Mol % | $\Delta\alpha_R^S$ (10$^{-25}$ cm$^3$) | $\Delta\alpha_G^S$ (10$^{-25}$ cm$^3$) | Tg (° C.) | Change in color tone |
|---|---|---|---|---|---|---|---|---|---|---|---|
| Com. Ex. 1 | Dimethanoocta-hydronaphthalene (MU1) | | 2.9 | −1.9 | −8.9 | 8.3 | 100 | −8.9 | 8.3 | 142 | (5) |
| Com. Ex. 2 | 6-Methyl-6-methoxycarbonyl-1,4,5,8-dimethano-1,4,4a,5,6,7,8,8a-octahydro-naphthalene (MU2) | | 2.2 | −1.1 | −12.1 | 10.4 | 100 | −12.1 | 10.4 | 140 | (5) |
| Com. Ex. 3 | Ethylene (MU1) | | 1.1 | −1.1 | −2.0 | 1.0 | — | — | — | 141 | (5) |
| | Dimethanoocta-hydronaphthalene (MU1) | | | | −6.8 | 4.2 | — | | | | |
| Com. Ex. 4 | Ethylene (MU1) | | 1.5 | −2.1 | −2.0 | 1.0 | — | — | — | 140 | (5) |
| | Norbornene (MU1) | | | | −2.5 | 3.1 | — | | | | |
| Com. Ex. 5 | Ethylene (MU1) | | −0.20 | 2.1 | −2.0 | 1.0 | 69 | −5.6 | 3.1 | 35 | (5) |
| | Norbornene (MU1) | | | | −2.5 | 3.1 | 15 | | | | |
| | Styrene (MU2) | | | | −23.9 | 12.0 | 16 | | | | |

INDUSTRIAL APPLICABILITY

The optical member in accordance with the present invention is superior in its heat resistance and transparency and high in its stability of optical properties. Therefore, the optical member can be used as, for example, a constituent of optical systems in a liquid crystal display, thereby suppressing change in display color tone depending on variation of using circumstances of the liquid crystal display.

What is claimed is:

1. An optical member comprising a polymer which is amorphous and has a glass transition temperature of not lower than 110° C. and optical property parameters $O'_R(\infty)$ and $O'_G(\infty)$ that satisfy the following inequality (1), $$|O'_G(\infty)| < -0.75 \times |O'_R(\infty)| + 0.017 \tag{1}$$

2. The optical member according to claim 1, wherein the polymer comprises a copolymer comprising an m kind of monomer unit satisfying the following inequality (2), wherein m is an integer of not less than 1, and an n kind of monomer unit not satisfying the following inequality (2), wherein n is an integer of not less than 1, and satisfying the following inequalities (3) and (4), $$-9.5 \times 10^{-25} \text{ cm}^3 < \Delta\alpha_R^S \tag{2}$$

$$-1.0 \times 10^{-24} < \Delta\alpha_R^P < -5.0 \times 10^{-25} \text{ cm}^3 \tag{3}$$

$$3.4 \times 10^{-25} < \Delta\alpha_G^P < 5.4 \times 10^{-25} \text{ cm}^3 \tag{4}$$

wherein, in inequality (2), $\Delta\alpha_R^S$ is a parameter defined by the following equality (I), $$\Delta\alpha_R^S = \alpha_1^S - (1/2)(\alpha_2^S + \alpha_3^S) - (3/4)P(\alpha_1^S - \alpha_3^S)$$

wherein, in equality (I), $\alpha_1^S$, $\alpha_2^S$ and $\alpha_3^S$ are each a main value of polarizability tensor of a side chain in a monomer unit and satisfy a relation of $\alpha_2^S \geq \alpha_1^S \geq \alpha_3^S$, and P is 0 when the monomer unit has a side chain bonding to main chain at two or more positions, or P is 1 when the monomer unit has no side chain bonding to main chain at two or more positions, and wherein, in inequalities (3) and (4), $\Delta\alpha_R^P$ and $\Delta\alpha_G^P$ are parameters defined by the following equalities (i) and (ii), respectively, $$\Delta\alpha_R^P = \sum_{i=1}^{m}(X_i \Delta\alpha_{RAi}^S) + \sum_{j=1}^{n}(Y_j \Delta\alpha_{RBj}^S) \tag{i}$$

$$\Delta\alpha_G^P = \sum_{i=1}^{m}(X_i \Delta\alpha_{GAi}^S) + \sum_{j=1}^{n}(Y_j \Delta\alpha_{GBj}^S) \tag{ii}$$

wherein, in equalities (i) and (ii), $X_i$ is a molar fraction of an arbitrary monomer unit satisfying inequality (2), $Y_j$ is a molar fraction of an arbitrary monomer unit not satisfying inequality (2), $\Delta\alpha_{RAi}^S$ is $\Delta\alpha_R^S$ of an arbitrary monomer unit satisfying inequality (2), $\Delta\alpha_{RBi}^S$ is $\Delta\alpha_R^S$ of an arbitrary monomer unit not satisfying inequality (2), and, in equality (ii), $\Delta\alpha_{GAi}^S$ and $\Delta\alpha_{GBi}^S$ are $\Delta\alpha_G^S$ value defined by the following equality (II) with respect to an arbitrary monomer unit satisfying inequality (2) and $\Delta\alpha_G^S$ value defined by the following equality (II) with respect to an arbitrary monomer unit not satisfying inequality (2), respectively, $$\Delta\alpha_G^S = (1/4)(\alpha_2^S - \alpha_3^S) - (1/8)P(\alpha_1^S - \alpha_3^S) \tag{II}$$

wherein, in equality (II), $\alpha_1^S$, $\alpha_2^S$, $\alpha_3^S$ and P are as defined above.

3. The optical member according to claim 2, wherein the copolymer comprises a monomer unit derived from a compound selected from the group consisting of olefins having 2 or 3 carbon atoms, norbornene and norbornene derivatives as the monomer unit satisfying inequality (2), and a monomer unit derived from a vinyl group-containing cyclic compound as the monomer unit not satisfying inequality (2).

4. The optical member according to claim 3, wherein the copolymer comprises a monomer unit derived from an aromatic vinyl compound as the monomer unit not satisfying inequality (2).

5. The optical member according to claim 4, wherein the copolymer has a total molar fraction of the monomer unit not satisfying inequality (2) ranging from 0.1 to 0.4 inclusive.

6. The optical member according to claim 3, wherein the copolymer comprises a monomer unit derived from an alicyclic vinyl compound as the monomer unit not satisfying inequality (2).

7. The optical member according to claim 6, wherein the copolymer has a total molar fraction of the monomer unit not satisfying inequality (2) ranging from 0.3 to 0.8 inclusive.

8. The optical member according to any one of claims 1 to 7, which is a polarizing plate-protecting film.

9. The optical member according to any one of claims 1 to 7, which is a substrate for liquid crystal cells.

10. A polarizing plate, wherein the optical member according to any one of claims 1 to 7, which is a polarizing plate-protecting film, is mounted on at least one side surface of a polarizing film.

11. A liquid crystal display, which is provided with a substrate for liquid crystal cells according to a polarizing plate according to claim 10.

12. A liquid crystal display, which is provided with a polarizing plate according to claim 10.

* * * * *